April 17, 1945.  L. M. GRIFFIN  2,373,677
DETACHABLE AUXILIARY FIN MEANS FOR AIRCRAFT
Filed Aug. 5, 1943  2 Sheets-Sheet 1
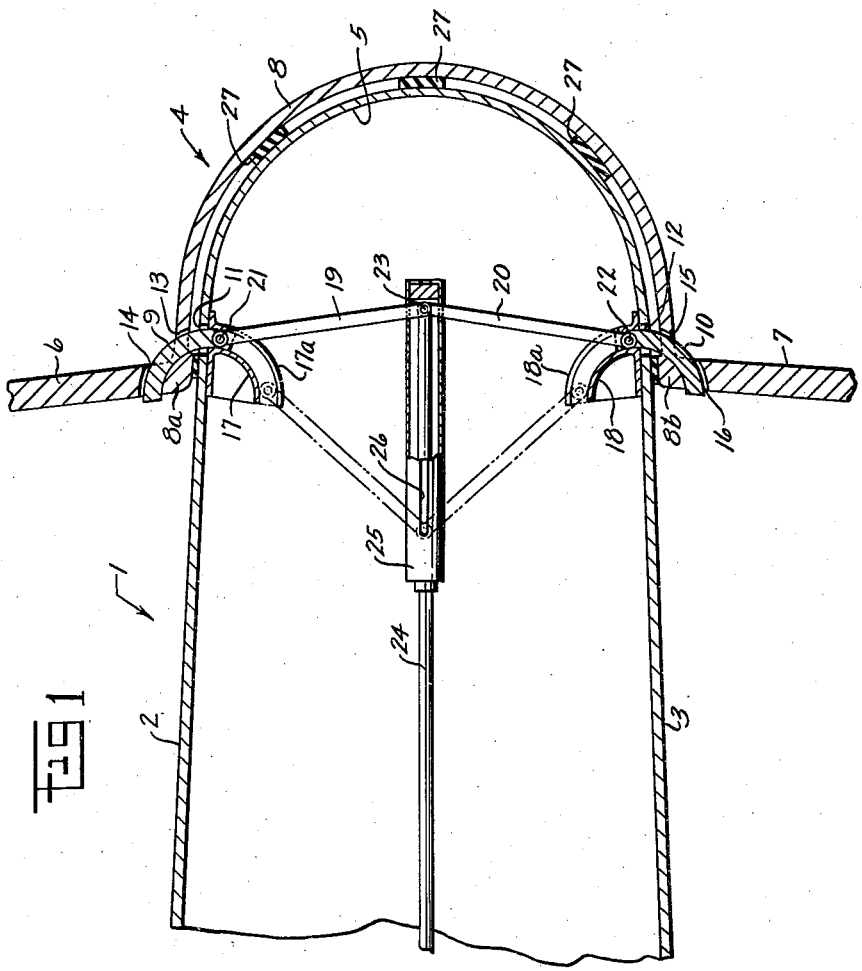
INVENTOR
LOUIS M. GRIFFIN April 17, 1945. L. M. GRIFFIN 2,373,677
DETACHABLE AUXILIARY FIN MEANS FOR AIRCRAFT
Filed Aug. 5, 1943 2 Sheets-Sheet 2
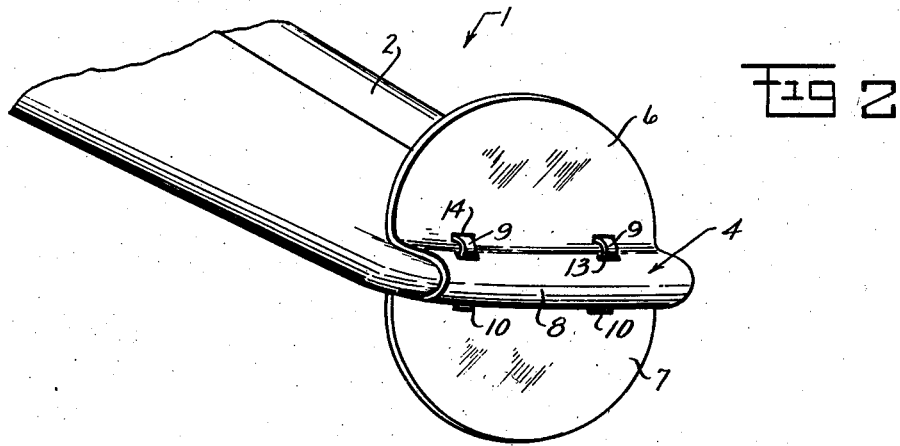
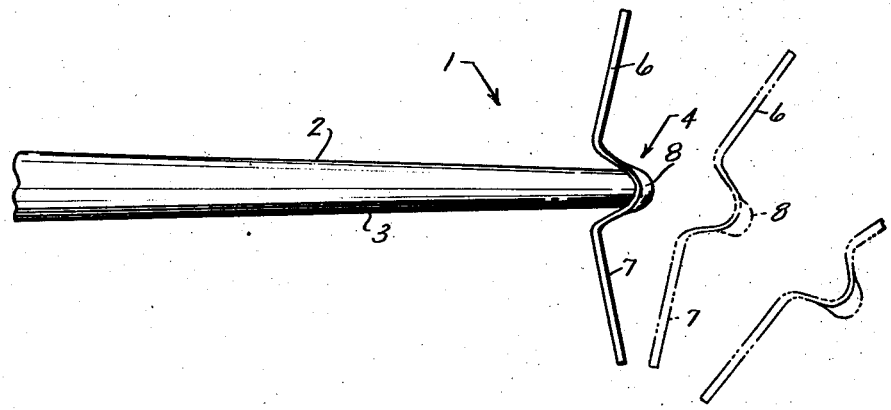
INVENTOR
LOUIS M. GRIFFIN Patented Apr. 17, 1945

2,373,677

UNITED STATES PATENT OFFICE 2,373,677

DETACHABLE AUXILIARY FIN MEANS FOR AIRCRAFT

Louis M. Griffin, New Orleans, La.

Application August 5, 1943, Serial No. 497,534

6 Claims. (Cl. 244—91)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to fin means for the supporting surfaces of aircraft and particularly adapted to be applied to the ends of aircraft wings for increasing lift to assist in take-off of the aircraft under increased loads.

The purpose of providing such wing tip end fin means is to increase lift and consequently shorten the space required for take-off and thereby permit existing planes to take off with greater loads.

At high angles of attack, as during take-off and initial climb, induced drag due to wing tip vortices is quite costly in terms of efficiency. Vertically disposed fin members provided at the ends of the wings of airplanes will decrease drag as much as one third and produce an increase of some twelve percent in maximum lift. The beneficial effects of such fin means are even more pronounced at such angles of attack where planes have low aspect ratios. A further advantage involves an increase in the rate of climb.

Since the value of fin means of the class described is of a negative order at low angles of attack or under level flight conditions where speed is the prime factor, this invention contemplates the provision of detachable fin means of the class described which may be released from the airplane to be dropped to the ground when altitude has been attained, the fin means being of no further advantage after the attainment of sufficient altitude and the fin means not usually being needed for landing purposes on account of the fact that the fuel load will usually be sufficiently decreased at the end of the flight to compensate for additional cargo loading and enable the plane to be landed in the available space despite its heavier cargo load.

In the light of the foregoing, the invention contemplates the provision of novelly constructed fin members adapted to be detachably secured adjacent the extreme ends of the airplane wing and the provision of novel means for detachably securing said fin members in such position. The fin members provided at the ends of the airplane wings each comprises a fin section extending above, and substantially vertically disposed with respect to, the wing, a second fin section extending below and likewise substantially vertically disposed with respect to the wing, and an intermediate clamp section joining said fin sections and adapted to embrace the end portion of the wing. The clamp section is preferably resilient and of substantially U-shape in cross section and the ends of the clamp section normally stand away from the wing embraced thereby prior to locking the fin means to the wing. The ends of the clamp section 19 are then pressed toward one another into clamping engagement with the wing and the locking means is adapted for locking engagement with the ends of the clamp section to maintain the same in resilient engagement with the wing in locked condition, whereby the fin means will tend to spring away from the wing, when released from locked condition in flight.

The ends of the clamp means and the adjacent portions of the upper and lower fin sections are provided with openings for receiving locking lugs or latches movable through the upper and lower skin respectively of the airplane wing, and operating means for effecting locking and unlocking movement of the locking lugs or latches comprises a toggle joint including an operating rod and toggle links pivoted to said rod and respectively pivoted to said locking lugs or latches.

In the drawings,

Figure 1 is a longitudinal vertical sectional view through a wing and the fin means of my invention illustrating the invention.

Figure 2 is a perspective view looking toward one end of an airplane wing showing the fin means of the invention applied thereto.

Figure 3 is a side view of an airplane wing showing the clamp section of the fin means in its normal spread-apart condition prior to being pressed into clamping engagement with the wing, or when unlocked.

Now referring to the drawings for a detailed description of the invention, the numeral 1 generally indicates an airplane wing and the numerals 2 and 3 represent the upper and lower surfaces or skins thereof respectively. A fin member generally indicated by the numeral 4 is shown applied to the wing 1 adjacent one extreme end 5 thereof. One such fin member 4 is applied to the extreme outer end of each wing of the airplane. This fin member 4 may be constructed of any cheap, and preferably resilient, material having sufficient strength under tension, such as plastic bonded plywood. The form of a single fin member 4 is roughly that of a circle with a diameter approximately equal to the chord of the wing on which it is designed to be used and the fin member 4 comprises an upper fin section 6 adapted, when the fin member is properly associated with the wing, to be substantially vertically disposed with respect to the upper surface 2 of the wing. Said fin member 4 also includes a lower fin section 7 likewise adapted to be substantially vertically disposed with respect to the lower surface 3 of the wing 1. An intermediate clamp section 8 joins the fin sections 6 and 7 and is adapted to embrace the end 5 of the wing 1 intermediate said fin sections. The clamp section 8, as seen best in Figure 1, is generally of substantially U-shape in cross section and is slightly larger than the portion of the wing 1 which it is adapted to embrace but designed to snugly receive the end 5 of the wing. Preferably, as illustrated by Figure 3, the clamp section 8 is formed so that the distance between the ends 8a and 8b of the clamp section is normally quite a little greater than the vertical distance between the points on the respective upper and lower faces 2 and 3 of wing 1 with which the ends 8a and 8b of the clamp section 8 are adapted to engage when the fin member is locked in cooperative relation with the wing 1. In other words the normal condition of the resilient clamp section 8 is such that the ends 8a and 8b thereof tend to stand away from the adjacent surfaces 2 and 3 of the wing 1, as indicated in Figure 3, when the end 5 of the wing 1 is received within the clamp section 8 prior to locking the fin member to the wing 1 in the manner indicated in Figure 1. As indicated in the latter figure the ends 8a and 8b of the clamp section 8 are compressed toward one another into engagement with the respective wing surfaces 2 and 3 to be maintained in such resiliently clamped condition by the locking means now to be described.

The locking means comprises the arc shaped locking lugs or latches 9 and 10 respectively adapted to move through suitable openings 11 and 12 in the respective upper and lower surfaces 2 and 3 of the wing 1 into and out of engagement with the latch receiving means provided in the fin member 4, said latter means conveniently comprising suitable openings 13 and 14 in the clamp section 8 and the fin section 6 respectively for receiving the latch member 9 and openings 15 and 16 in the clamp section 8 and fin section 7 respectively for receiving the latch 10. The arc shaped lugs or latches 9 and 10 are positioned for movement in guideways 17 and 18, respectively, secured to the airplane wing 1.

The operating means for the latches 9 and 10 comprises a toggle joint consisting of the toggle links 19 and 20 and the operating rod 24. The guideways 17 and 18 are slotted as indicated at 17a and 18a respectively for accommodation of the toggle links 19 and 20 respectively pivoted to the latch 9 as at 21 and to the latch 10 as at 22, said links 19 and 20 being pivotally connected to a pivot pin 23 carried by the operating rod 24 which extends into and is guided for movement longitudinally by a guide tube 25. Pivot pin 23 rides in diametrically opposed slots at either side of the guide tube 25 and suitable diametrically opposed slots are provided in the guide tube 25 for accommodation of the toggle links 19 and 20.

Suitable cushion members 27 are provided interiorly of the clamp portion 8 of the fin member 4 for cushioning the engagement of the fin member 4 with respect to the airplane wing 1. The cushion member 27 may be composed of rubber or other suitable resilient material.

In operation, the fin member 4 is emplaced upon the end 5 of the wing 1 with the clamp section 8 embracing the wing in the manner indicated in Figure 3, the ends 8a and 8b of the clamp section 8 being normally spread apart out of engagement with the adjacent surfaces 2 and 3 of the wing 1, as likewise indicated in Figure 3, prior to locking the fin member 4 to the wing 1. In the operation of locking the fin member in place on the wing 1 the ends 8a and 8b of the clamp section 8 are sprung toward each other into engagement with the adjacent surfaces 2 and 3 of the wing 1 as indicated in Figure 1 and then the operating rod 24 is moved in a rightward direction, having reference to Figure 1, effecting the corresponding movement of the locking latches 9 and 10 and the toggle links 19 and 20 from the unlocked dotted line positions of these members indicated in Figure 1 to the locked full line position of said members likewise indicated in Figure 1. The locking latches 9 and 10 are guided in their movement in an arcuate path by the arcuate guideways 17 and 18. In the unlocked condition of the latches 9 and 10, the outer ends thereof are retracted into, or at least flush with, the respective surfaces or skins 2 and 3 and in the locked condition, of course, the locking latch 9 extends through the opening 13 and enters the opening 14 while the locking latch 10 extends through the opening 15 and enters the opening 16.

With fin members 4 locked to the wing ends of an airplane in the manner indicated in Figure 1, the airplane is enabled to take off in shorter space despite the increased loads and, upon attaining altitude, the fin members 8, being no longer required, may be dropped off the wings. To accomplish the latter result it is only necessary to retract the operating rod 24 in a leftward direction, having reference to Figure 1, to bring the locking latches 9 and 10 and the toggle links 19 and 20 into the dotted line position shown in said figure. Under such condition, of course, it will be apparent that the pressure tending to hold the ends 8a and 8b of the clamp section 8 in an inwardly compressed position will be released, permitting said ends 8a and 8b of the clamp section 8 to spring outwardly into the normal condition of Figure 3 due to the resilience of the clamp section 8, and such action will tend to cause the fin members 4 to spring away from the wing ends and thus positively release or detach the same from the wing so that said fin members may drop to the ground.

It will be noted that the arrangement of the toggle links is such that when the latches 9 and 10 and the links 19 and 20 are in their full line locked position of Figure 1, an over-dead center relation is effected with respect to the pivot points 21, 23 and 22, 23. It will be apparent that the fin member 4 may be formed all of the same material and even of a single piece of material if the same has the proper strength under tension and preferably sufficient resilience to produce the spring effect desired for the clamp section 8. Alternatively, of course, the fin sections 6 and 7 and the clamp section 8 may be formed as separate sections and integrally secured together, in which event the clamp section 8 may be formed of a different and more resilient material than the fin sections 6 and 7 if desired.

It is noted that in the final locked condition of the fin member 4 with respect to the end of the wing 1, the fin sections 6 and 7 preferably have a slight inboard inclination from the vertical, as indicated in Figure 1.

The form of each fin member 4 is roughly that of a circle with a diameter approximately equal to the chord of the wing for which it is designed to be used, the fin sections 6 and 7 each therefore being substantially semicircular.

I am aware of the existence of United States Patents Nos. 1,724,110, 1,763,257, 1,157,636 and 1,656,193 relating to wing fins for aircraft and of U. S. Patent 2,283,223 relating to releasable supporting surfaces for aircraft wings and I make no claim to the subject matter disclosed in said patents.

Having thus described my invention, what I claim as new and desire to secure by Letters Patent of the United States, is

1. In combination with an airfoil, fin means adapted for releasable attachment thereto and comprising a fin section adapted to extend above the airfoil, a second fin section adapted to extend below the airfoil, and an intermediate clamp section formed of resilient material and of substantially U-shape in cross section adapted to embrace a portion of the airfoil intermediate said fin sections with the ends of the clamp section in its normal condition standing away from the adjacent surfaces of the airfoil embraced thereby, and locking means associated with the airfoil and adapted for locking engagement with the ends of the clamp section to lock the same in resilient engagement with said airfoil, whereby the fin means will tend to spring away from the airfoil when released from said locked condition.

2. The structure as claimed in claim 1, wherein the locking means comprises a plurality of latches each of which is adapted for locking engagement with a respective end of the clamp section, and means for operating said locking means comprising a toggle joint including an operating rod and toggle links pivoted to said rod and respectively pivoted to said latches.

3. In combination with an airfoil, fin means adapted for releasable attachment thereto and comprising a fin section adapted to extend above the airfoil, a second fin section adapted to extend below the airfoil, an intermediate clamp section formed of resilient material and adapted to embrace the portion of the airfoil intermediate said fin sections with the ends of the clamp section standing away from the adjacent surfaces of the airfoil embraced by the clamp section in its normal condition, said ends of the clamp section being adapted to be sprung toward one another into engagement with the adjacent surfaces of the airfoil embraced thereby, and locking means associated with the airfoil and adapted for locking engagement with the ends of the clamp section to lock said ends respectively in resilient engagement with adjacent surfaces of the airfoil embraced by said clamp section, the ends of the clamp section being adapted to return to their normal condition standing away from the adjacent surfaces of the airfoil when the ends of the clamp section are released from locked condition.

4. In combination with an airfoil, fin means adapted for releasable attachment thereto and comprising a fin section adapted to extend above the airfoil, a second fin section adapted to extend below the airfoil, and an intermediate clamp section formed of resilient material and of substantially U-shape in cross section adapted to embrace the portion of the airfoil intermediate said fin sections with the ends of the clamp section in its normal condition standing away from the adjacent surfaces of the airfoil embraced thereby, and locking means associated with the airfoil and adapted for locking engagement with the ends of the clamp section to lock the same in resilient engagement with said airfoil, whereby the fin means will tend to spring away from the airfoil when released from said locked condition, said locking means comprising arcuate latch members, and an arcuate guide member for each latch member, the clamp section having openings therethrough adjacent its ends, each of said fin sections having an opening therethrough, each of said latch members being movable in an arcuate path in its respective guide member so that a portion of each of said latch members extends through a respective opening in said clamp section and through the opening in one of said fin sections.

5. In combination with an airfoil, fin means adapted for releasable attachment thereto and comprising a fin section adapted to extend above the airfoil, a second fin section adapted to extend below the airfoil, and an intermediate clamp section formed of resilient material and of substantially U-shape in cross section adapted to embrace the portion of the airfoil intermediate said fin sections with the ends of the clamp section in its normal condition standing away from the adjacent surfaces of the airfoil embraced thereby, and locking means associated with the airfoil and adapted for locking engagement with the ends of the clamp section to lock the same in resilient engagement with said airfoil, whereby the fin means will tend to spring away from the airfoil when released from said locked condition, said locking means comprising arcuate latch members, and an arcuate guide member for each latch member, the clamp section having openings therethrough adjacent its ends, each of said fin sections having an opening therethrough, each of said latch members being movable in an arcute path in its respective guide member so that a portion of each of said latch members extends through a respective opening in said clamp section and through the opening in one of said fin sections, operating means for said locking means comprising an operating rod, guide means for guiding said rod for longitudinal movement, and a respective link pivoted to each of said latches and also pivoted to said rod.

6. In combination with an airplane wing, fin means adapted for releasable attachment to the end of said wing, said fin means comprising a fin section adapted to extend above the wing, a fin section adapted to extend below the wing, said fin sections being substantially vertically disposed with respect to said wing when the fin means is secured thereto, and an intermediate clamp section formed of resilient material and of substantially U-shape in cross section adapted to embrace the portion of the wing intermediate the said fin sections with the ends of the clamp section in its normal condition extending away from the adjacent surfaces of the wing embraced thereby, and locking means associated with the wing and adapted for locking engagement with the ends of the clamp section to lock the same in resilient engagement with said wing, whereby the fin means will tend to spring away from the wing when released from said locked condition, said locking means comprising arcuate latch members, and an arcuate guide member for each latch member, said clamp section having an opening therethrough adjacent each end thereof, each of said fin sections having an opening therethrough adjacent the ends of the clamp section, each of said latch members being movable in an arcuate path in its respective guide member so that a portion of each of said latch members extends through a respective opening in said clamp section and through the opening in one of said fin sections, operating means for said locking means comprising an operating rod, guide means for guiding the rod for longitudinal movement, and a respective link pivoted to each respective latch member and also pivoted to said rod, said arcuate guide members each having a slot for accommodating the respective link associated with the latch member operating therein.

LOUIS M. GRIFFIN.